(12) United States Patent
Parsons et al.

(10) Patent No.: US 12,056,838 B2
(45) Date of Patent: Aug. 6, 2024

(54) COMPUTER-AUTOMATED SEPARATION RULES COMPLIANCE ANALYSIS

(71) Applicant: The Boeing Company, Chicago, IL (US)

(72) Inventors: James Philip Parsons, Marysville, WA (US); William Dwyer McGarry, Federal Way, WA (US); James J. Troy, Issaquah, WA (US); Steven E. Malarkey, Lynnwood, WA (US); Robert S. van den Berg, Guyton, GA (US)

(73) Assignee: The Boeing Company, Arlington, VA (US)

( * ) Notice: Subject to any disclaimer, the term of this patent is extended or adjusted under 35 U.S.C. 154(b) by 56 days.

(21) Appl. No.: 17/805,790

(22) Filed: Jun. 7, 2022

(65) Prior Publication Data

US 2022/0398818 A1 Dec. 15, 2022

Related U.S. Application Data

(60) Provisional application No. 63/202,448, filed on Jun. 11, 2021.

(51) Int. Cl.
*G06T 19/20* (2011.01)
*G06T 15/08* (2011.01)
*G06V 20/20* (2022.01)

(52) U.S. Cl.
CPC .............. *G06T 19/20* (2013.01); *G06T 15/08* (2013.01); *G06V 20/20* (2022.01); *G06T 2210/21* (2013.01); *G06T 2219/2004* (2013.01)

(58) Field of Classification Search
CPC ..... G06T 19/20; G06T 15/08; G06T 2210/21; G06T 2219/2004; G06T 19/00; G06V 20/20
See application file for complete search history.

(56) References Cited

U.S. PATENT DOCUMENTS 5,347,459 A * 9/1994 Greenspan ............... B25J 19/06
700/255
8,060,345 B2 * 11/2011 Lee ......................... B64D 11/00
244/118.6

(Continued)

OTHER PUBLICATIONS

McNeely, W. et al., "Six Degree-of-Freedom Haptic Rendering Using Voxel Sampling," Proceedings of the 26th Annual Conference on Computer Graphics and Interactive Techniques, Jul. 1, 1999, New York, USA, 8 pages.

*Primary Examiner* — Maurice L. McDowell, Jr.
*Assistant Examiner* — Donna J. Ricks
(74) *Attorney, Agent, or Firm* — Alleman Hall & Tuttle LLP (57) ABSTRACT

A computer-automated separation rules compliance method is disclosed. Separation rules that establish separation distance requirements between objects in a three-dimensional (3D) virtual environment are defined. Sample locations associated with at least some of the objects in the 3D virtual environment are specified. One or more of proximity and/or collision analysis is performed on the sample locations to determine separation distances between the objects. The determined separation distances are compared to the separation distance requirements. Objects in the 3D virtual environment that violate the separation rules based on said comparing are identified.

20 Claims, 8 Drawing Sheets (56) References Cited

U.S. PATENT DOCUMENTS

| | | | |
|---|---|---|---|
| 2006/0149516 A1* | 7/2006 | Bond | G06F 30/20 703/6 |
| 2010/0063788 A1* | 3/2010 | Brown | G06T 19/00 703/6 |
| 2020/0082639 A1 | 3/2020 | Parsons et al. | |
| 2020/0348820 A1* | 11/2020 | Zhou | G06T 19/006 |

* cited by examiner

COMPUTER-AUTOMATED SEPARATION RULES COMPLIANCE ANALYSIS

CROSS REFERENCE TO RELATED APPLICATIONS

This application claims priority to U.S. Provisional Patent Application Ser. No. 63/202,448, filed Jun. 11, 2021, the entirety of which is hereby incorporated herein by reference for all purposes.

FIELD

The present disclosure relates generally to a three-dimensional (3D) virtual environment, and more specifically, to performing constraint compliance analysis on objects modeled in a 3D virtual environment.

BACKGROUND

A three-dimensional (3D) virtual environment includes virtual objects that can correspond to real-world objects. Such a 3D virtual environment may be used in a product development process that allows for interested viewers (designers, clients, customers, etc.) to see a virtual as-designed version of a product, for example to aid in collaborating on design changes without requiring a physical, real-world prototype of the product to be created. In a 3D virtual environment, it is desirable to know physical separation distances between objects to ensure that such separation distances comply with various separation rules and constraints. Manually analyzing object-to-object distances with respect to separation rules and constraints in a 3D virtual environment including many objects may be error prone, inconsistent, and time consuming to the point of being unfeasible.

SUMMARY

A computer-automated separation rules compliance method is disclosed. Separation rules that establish separation distance requirements between objects in a three-dimensional (3D) virtual environment are defined. Sample locations associated with at least some of the objects in the 3D virtual environment are specified. One or more of proximity and collision analysis is performed on the sample locations to determine separation distances between the objects. The determined separation distances are compared to the separation distance requirements. Objects in the 3D virtual environment that violate the separation rules based on said comparing are identified.

The features, functions, and advantages that have been discussed can be achieved independently in various embodiments or may be combined in yet other embodiments, further details of which can be seen with reference to the following description and drawings.

DETAILED DESCRIPTION

Manually analyzing object-to-object distances with respect to separation constraints in a virtual three-dimensional (3D) environment may have various issues. In one example, using a "brute force" approach for separation analysis involves manually modeling many paths (e.g., millions of paths) in different directions and along different geometrical planes in a 3D virtual environment. In some examples, each path is iteratively stepped through. At each iterative position along each of the different paths, object-to-object distances are analyzed for constraint compliance. Such a manual approach may be error prone, inconsistent, and time consuming to the point of being unfeasible.

To address the above and other issues, examples are disclosed that relate to a computer-automated process for efficient analysis of separation rules compliance for objects in a 3D virtual environment. Separation rules that establish separation distance requirements between objects in the 3D virtual environment are defined. Sample locations associated with at least some of the objects in the 3D virtual environment are specified. One or more of proximity and collision analysis is performed on the sample locations to determine separation distances between the objects. The determined separation distances are compared to the separation distance requirements. Objects in the 3D virtual environment that violate the separation rules based on said comparing are identified.

By performing one or more of proximity and collision analysis on intelligently sampled locations that are associated with objects in the 3D virtual environment, proximity and/or collision analysis need not be performed at locations in the 3D virtual environment that are not of interest. Moreover, intelligent sampling of locations in the 3D virtual environment increases the efficiency at which proximity and/or collision analysis is performed by reducing computation while still maintaining a high enough level of detail to check for constraint compliance. Such selective analysis provides the ability to find critical vulnerable objects associated with separation distances in an automated fashion that is more efficient than the "brute force" approach described above.

The herein-described computer-automated process for efficient analysis of separation rules compliance of objects in a 3D virtual environment may be broadly applicable to any suitable type of virtual object or virtual environment in any suitable type of application. For ease of explanation, the discussion of such an approach will be limited here to the context of designing aircraft and/or aviation components, but the concepts are not limited to aircraft and/or aviation applications. Other applications are contemplated such as but not limited to, nautical environments, cruise ships, cargo vehicles, passenger vehicles, spacecraft, satellites, and the like. Within the context of designing aircraft and/or aviation components, many different types of constraints may be applied to comply with industry regulations. Such separation rules establish separation distance requirements between objects. Separation distance requirements may include one or both of minimum distance requirements and maximum distance requirements depending on the characteristics of the given component and the position of the component in the environment.

Figure 1:
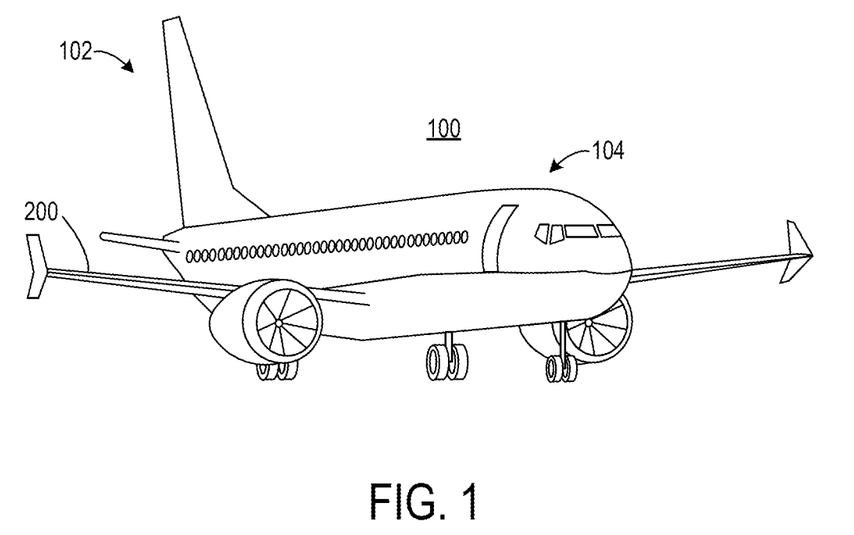
FIG. 1 show an example aircraft that may be modeled in a three-dimensional (3D) virtual environment.

FIG. 1 shows virtual aspects of an example 3D virtual environment 100 including a virtual aircraft 102. The virtual aircraft 102 can include a myriad of modeled objects in the form of aviation components that are modeled in the 3D virtual environment 100. Non-limiting examples include, but are not limited to, wings, flaps, engines, doors, windows, landing gear, and/or a tail among other 3D modeled components on an exterior 104 of the aircraft 102. Additionally, aviation components can be modeled within an interior (not shown) of the aircraft 102 including, but not limited to aviation components located in a cockpit, cabin, galley, lavatory, and cargo area. The aircraft 102 may include any suitable number of modeled aviation components. For example, the number of modeled aviation components included in the aircraft 102 may be in the tens of thousands, hundreds of thousands, or more. Such a large number of modeled aviation components can make it particularly important and valuable to have efficient analysis of separation rules compliance.

Figure 2:
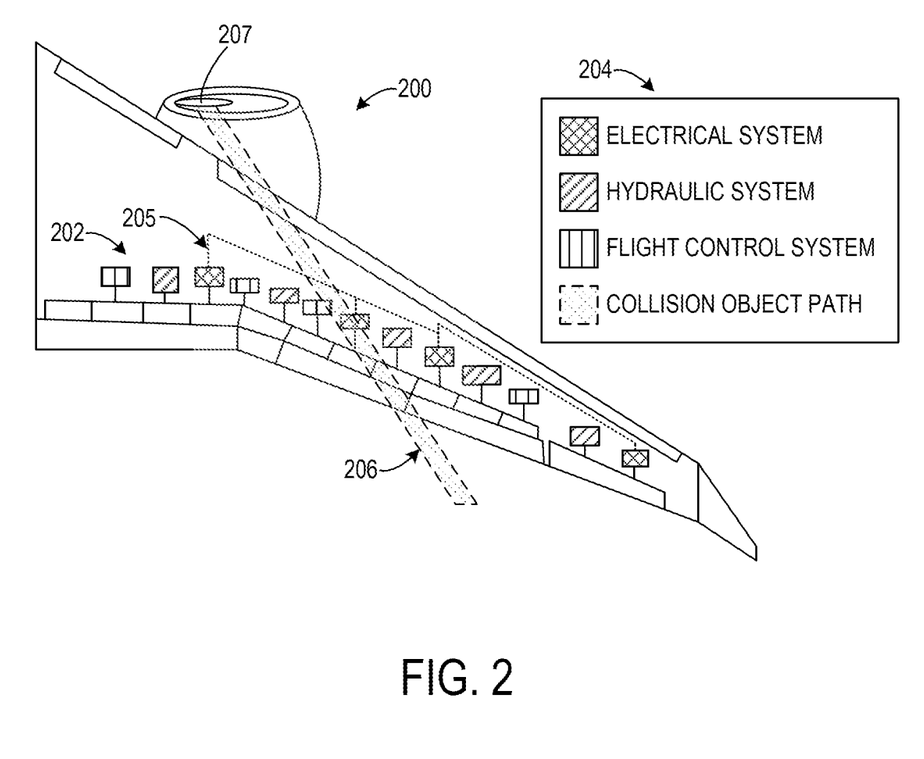
FIG. 2 shows aspects of different control systems of the aircraft shown in FIG. 1.

FIG. 2 shows a wing 200 of the aircraft 102 shown in FIG. 1. The wing 200 includes a plurality of aviation components 202 that are associated with different control systems of the aircraft 102. As shown in key 204, (1) aviation components associated with an electrical system of the aircraft 102 are indicated by a diagonal cross-hatching pattern; (2) aviation components associated with a hydraulic system of the aircraft 102 are indicated by rightward diagonal hatching pattern; and (3) aviation components associated with a flight control system are indicated by a vertical hatching pattern.

In the illustrated example, separation rules establish distance constraints between the different aviation components. In some cases, the separation rules apply to static objects in the 3D virtual environment, such as different electrical wires 205 running within the wing 200. In other cases, the separation rules apply to moving objects in the 3D virtual environment, such as a landing gear that pivots between extended and retracted positions. Such distance requirements ensure that different aviation components within the same system (e.g., electrical, hydraulic, flight control) are separated enough to maintain redundancy and system operation in a scenario where one aviation component becomes degraded. In other examples, the requirements define other predetermined separation distances as need by regulation (e.g., aerospace, marine, or other such regulations).

In some examples, such distance constraints can be associated with different forms of energy, such as thermal energy, electromagnetic energy, and kinetic energy. A non-limiting example of separation rules based on thermal energy specify that a heat-producing component is required to be separated from a heat sensitive component by at least a given separation distance. A non-limiting example of separation rules based on electromagnetic energy specify that an aviation component that produces electromagnetic interference (EMI) noise is required to be separated from another aviation component that is EMI noise sensitive by at least a given separation distance. A non-limiting example of separation rules based on kinetic energy specify that aviation components in the same system are required to be separated from each other by at least a given separation distance such that a collision object, such as for example, a projectile (e.g., broken rotor blade, bird strike, blown tire) does not degrade both aviation components.

In the illustrated example, a motion path 206 of a collision object 207, in this example a hypothetical broken rotor blade, is shown passing through the wing 200. As the broken rotor blade 207 moves through the wing 200, the broken rotor blade collides with various aviation components associated with different systems. One or more of proximity and collision analysis is performed for the broken rotor blade at sampled locations along the motion path 206 to determine which aviation components collide with the broken rotor blade 207. Further, separation rules compliance analysis is performed in order to ensure that aviation components in the same system are spaced far enough apart to maintain redundancy such that the system can continue operation even after the thrown rotor blade 207 passes through the wing 200.

Such separation rules compliance analysis is performed for different collision objects having different motion paths throughout the 3D virtual environment 100. Such analysis informs whether proper separation is maintained between different aviation components under different types of collision events so that system will continue to operate when some parts of the system are degraded as a result of a collision. Further, such analysis identifies scenarios where a system is unable to continue operation, so that the system can be redesigned to be in compliance with the separation rules such that the system is more robust and better designed going forward. Moreover, computer automation of such analysis allows for more thorough and efficient identification of potential design issues. The above-described aircraft scenario is provided as a non-limiting example of objects modeled in a 3D virtual environment on which separation rules compliance analysis is performed in an efficient computer-automated manner. Such analysis can be performed on various modeled objects across myriad applications including but not limited to automotive, architectural, petroleum, computer, nautical, aeronautical, aerospace, and medicine.

Figure 3:
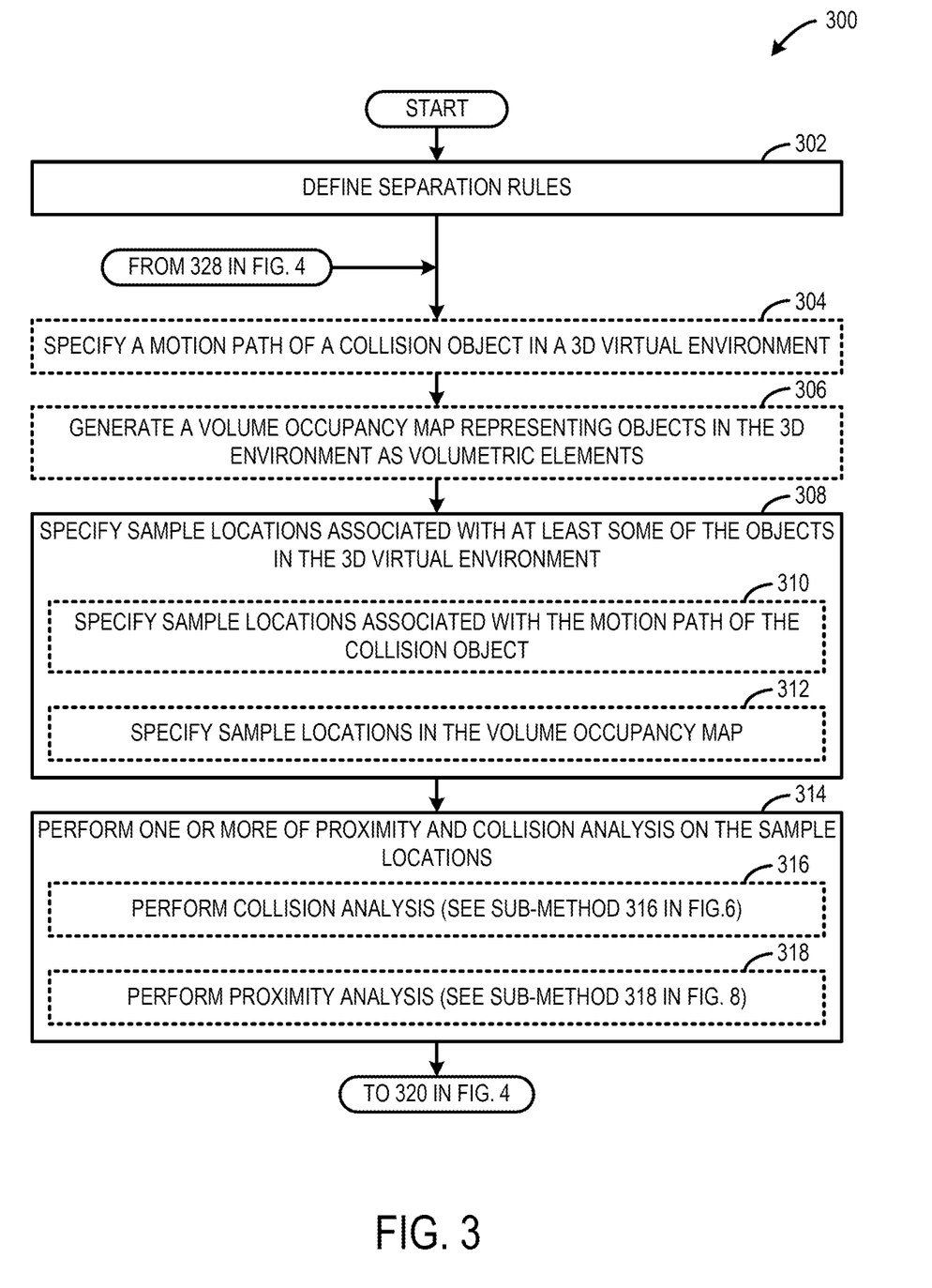
FIGS. 3 and 4 show an example computer-automated separation rules compliance method.
Figure 4:
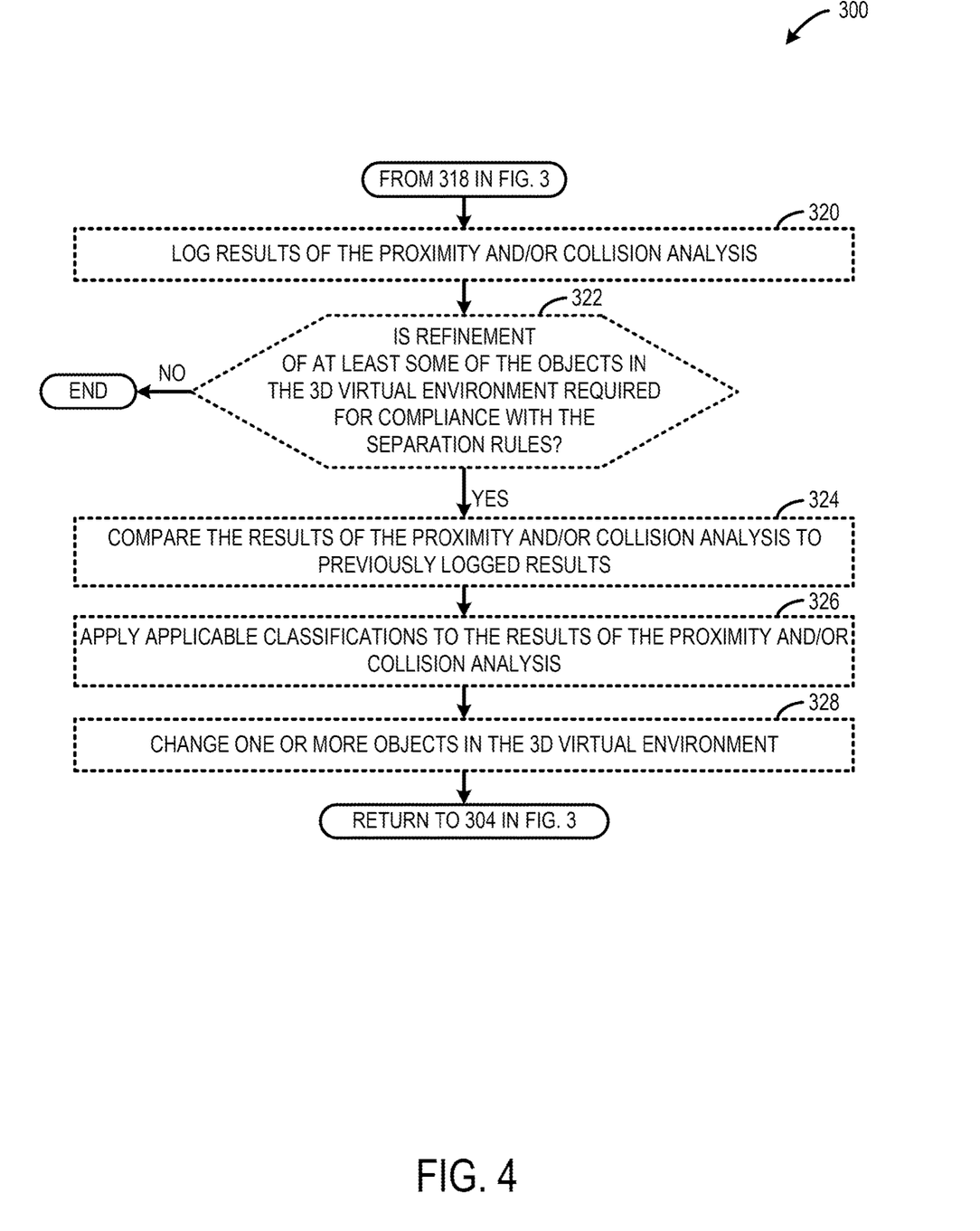

FIGS. 3 and 4 show an example computer-automated separation rules compliance method 300. For example, the method 300 is performed by a computing system 900 shown in FIG. 9, or generally by any suitable computer or a plurality of computers (e.g., a cloud computing system) having software/hardware specifications suitable to perform analysis of modeled objects in a 3D virtual environment. Note that steps of the method 300 that are indicated in dotted lines are optional and may be skipped or omitted in some examples.

At 302, the method 300 includes defining separation rules that establish separation distance requirements between objects in a three-dimensional (3D) virtual environment. In some examples, defining separation rules include receiving separation rules from an external source, such as a system designer, an industry regulator, or another governing body. In some examples, the system includes logic that is configured to create or derive separation rules based on available design information separate from externally supplied separation rules. In some examples, defining separation rules includes storing the separation rules in a database. For example, the separation rules may be stored in the database as a lookup table or another type of data structure.

In some examples, the separation rules may define predetermined allowable separation distances. For example, the separation rules may establish minimum (and sometimes maximum) separation distances between objects based on system requirements. These distance values will then be used to define a sequence of rules that will be compared to proximity/collision analysis results to check for rules violations.

In some examples, the separation rules include logical operators (e.g., AND, OR operators) involving separation distances involving two or more objects. In one example, if objects A, B, and C are all located within a defined spatial envelope, then the separation rule would be in violation. However, if object A is beyond the defined spatial envelope, then the rule would not be violated. Any suitable separation rules that establish separation distances between objects may be defined based on any suitable operational, regulatory, or other requirements.

In some examples, defining the separation rules further includes mapping a logical system design to physical elements implementing that system in the 3D virtual environment. Such mapping involves identifying particular physical implementations of more generalized logical elements, identifying which system each of the physical elements represents, and acquiring the corresponding separation rules stored in the lookup table. Such logical to physical mapping allows for the appropriate 3D objects to be used for the proximity and/or collision analysis.

In some embodiments, at 304, the method 300 optionally may include specifying a motion path of a collision object in the 3D virtual environment. A collision object may include any suitable object that moves throughout the 3D virtual environment. In some examples, the collision object may include a foreign object (e.g., an object that is not part of the design). Returning to the example of the aircraft, a foreign collision object may include a bird or other foreign object that could strike the aircraft while in operation. In some examples, the collision object may include a component of the aircraft that breaks off and collides with other components of the aircraft, such as a thrown rotor blade 207 shown in FIG. 2 or a piece of a blown tire as another example. Whether an object moves through the 3D virtual environment in an intended manner (e.g., a landing gear moving between an extended position and a retracted position) or an unintended manner (e.g., pieces of a blown tire flying through the air), separation rules compliance analysis is performed in the same manner by iteratively stepping through the motion path of the object and performing one or more of collision and proximity analysis at each step.

In some embodiments, at 306, the method 300 optionally may include generating a volume occupancy map of the 3D virtual environment. The volume occupancy map represent objects in the 3D virtual environment as volumetric elements. In one example, the volumetric elements that make up the volume occupancy map includes "voxels" that are 3D cubic volumetric elements. The volume occupancy map is one approach to intelligently specify sample locations of the 3D virtual environment for one or more of collision and proximity analysis.

Figure 5:
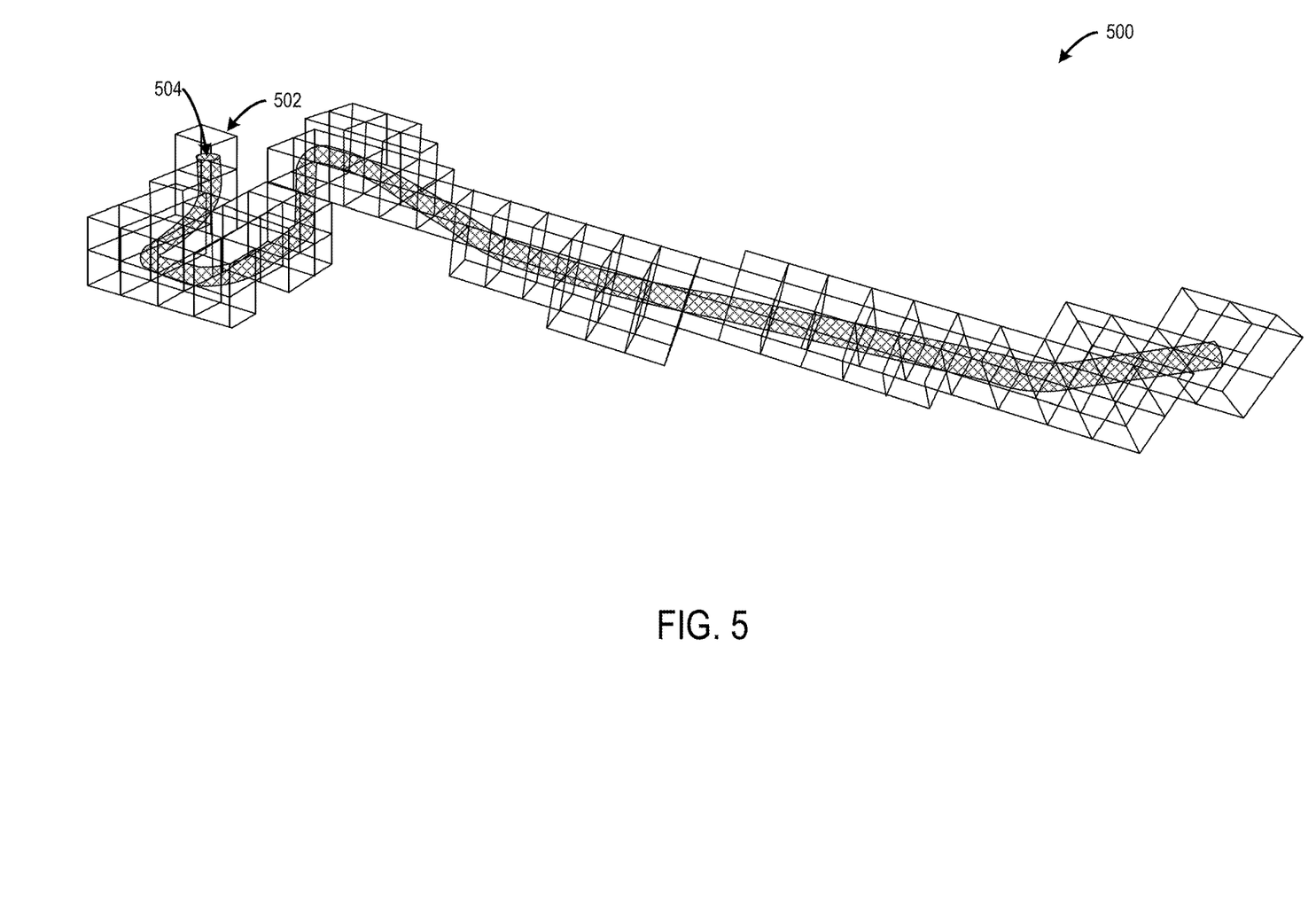
FIG. 5 shows an example volume occupancy map of an object in a 3D virtual environment where the object is represented as volumetric elements.

FIG. 5 shows aspects of an example volume occupancy map 500 of volumetric elements 502, "voxels" in the illustrated example, that collectively represent a wire 504 that may be modeled in a 3D virtual environment. The voxelized representation of the wire 504 is shown alone in simplified form. In one example, the wire 504 shown in FIG. 5 corresponds to a portion of the wire 207 shown in FIG. 2. In other examples, the wire 504 corresponds to a different wire of the virtual aircraft 102. The wire 504 is one of many modeled objects in the 3D virtual environment. Each volumetric element 502 represents a volume of space in the 3D virtual environment and corresponds to a different sample location of the wire 504. The wire 504 passes through at least a portion of each volumetric element 502 representing the wire 504 in the volume occupancy map 500. The size of the volumetric element 502 may be selected to balance accuracy and performance for the objects being modeled in the 3D virtual environment. The volumetric element size may be selected to be small enough to capture geometric details of the modeled objects while also being large enough to provide efficient sampling locations throughout the 3D virtual environment.

In other embodiments, the objects modeled in the 3D virtual environment may be represented in a different manner to intelligently specify different sample locations in the 3D virtual environment for one or more of collision and proximity analysis. In one alternative example, the objects modeled in the 3D virtual environment may be represented as polygons (e.g., vertices that makeup triangles). The objects modeled in the 3D virtual environment may be represented in any suitable manner that allows for sampling different locations in the 3D virtual environment to be intelligently specified.

Returning to FIG. 3, at 308, the method 300 includes specifying sample locations associated with at least some of the objects in the 3D virtual environment. The sample locations are locations of interest associated with different objects in the 3D virtual environment for which one or more of collision and proximity analysis is performed. In some examples, at least some specified sample locations correspond to different locations on a static object in the 3D virtual environment. In the example shown in FIG. 5, sample locations of the wire 504 correspond to the volumetric elements 502 in the volume occupancy map 500. In some examples, at least some specified sample locations may correspond to different locations on a moving object in the 3D virtual environment. In one example, sample locations of a landing gear are specified for when a landing gear in an extended position, when the landing gear is in a retracted position, and along a motion path of the landing gear moving between the extended position and the retracted position. In some examples, sample locations may be specified for each object in the 3D virtual environment or an area of interest in the 3D virtual environment.

In embodiments where a motion path of a collision object is specified, at 310, the method 300 optionally may include specifying at least some sample locations associated with the motion path of the collision object. In particular, at least some sample locations may correspond to the collision object while the collision object is at different steps along the motion path. In the example shown in FIG. 2, the sample locations of the broken rotor blade 207 correspond to different locations of the broken rotor blade 207 as the broken rotor blade 207 travels along the motion path 206.

In embodiments where a volume occupancy map is generated (e.g., the volume occupancy map 500 shown in FIG. 5), at 312, the method 300 optionally may include specifying at least some sample locations in the volume occupancy map. In one example, sample locations are specified that correspond to center points of volumetric elements that represent an object in the volume occupancy map. In another example, sample locations are specified that correspond to corners, edges, vertices, and/or other locations within volumetric elements that represent objects in the volume occupancy map.

A volume occupancy map is one way in which the number of locations specified for one or more of collision and proximity analysis may be reduced. Such an intelligent manner of specifying sampling locations significantly reduces computation relative to analyzing every location in a 3D virtual environment while still maintaining suitable detail to produce meaningful analysis results.

At 314, the method 300 includes performing one or more of proximity and collision analysis on the sample locations to determine separation distances between objects in the 3D virtual environment. One or more of proximity and collision analysis may be performed using different methods. For example, one or more of proximity and collision analysis may be performed using voxel-based methods, polygon-based methods, or other types of method that efficiently represent objects modeled in the 3D virtual environment.

Figure 6:
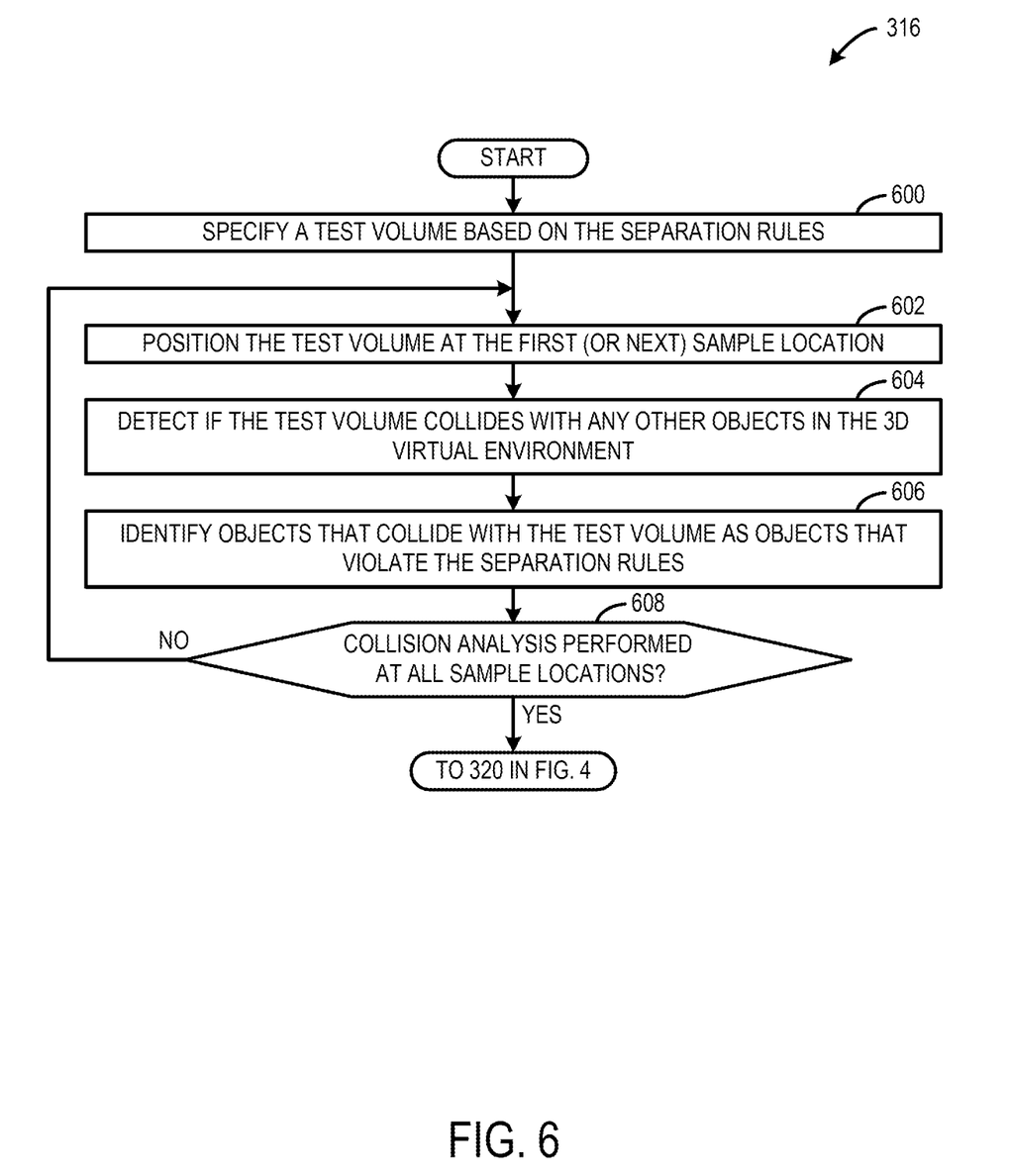
FIG. 6 shows an example collision analysis method.

In some embodiments, at 316, collision analysis optionally may be performed. FIG. 6 shows an example collision analysis sub-method 316 that may be performed as part of the computer-automated separation rules compliance method 300. In one example, the sub-method 316 is performed by the computing system 900 shown in FIG. 9, or generally any suitable computer or a plurality of computers.

At 600, the sub-method 316 includes specifying a test volume based on the specified separation rules. The test volume may assume any suitable shape. In one example, the test volume is a sphere. A radius of the sphere is specified based on the separation rules. In one example, an industry regulation specifies that a particular aviation component requires a clearance distance of five inches, and so the radius of the sphere is specified to cause collisions where that spacing is not maintained. In other examples, the test volume may be a cube or another shape.

At 602, the sub-method 316 includes positioning the test volume at a first sample location. Depending on the scenario, the sample location may correspond to a collision object on a motion path or a static object. In embodiments where a volume occupancy map representing objects in the 3D virtual environment as volumetric elements is generated (e.g., the volume occupancy map shown in FIG. 5), the sample location corresponds to a volumetric element associated with an object.

At 604, the sub-method 316 includes detecting if the test volume positioned at the sample location collides with any other object in the 3D virtual environment (or volume occupancy map).

At 606, the sub-method 316 includes identifying objects that collide with the test volume as objects that violate the separation rules. The names or ID numbers of objects that violate the separation rules along with the 3D locations of the violating objects are stored in memory of the computer. In some examples, additional levels of filtering are used, involving multi-pass analyses based on learning from prior analysis results. In some embodiments, identifying objects in the 3D virtual environment that violate the separation rules optionally may include displaying the objects, via a 3D visualization environment software application, to allow for a manual visual confirmation of such violations.

At 608, the sub-method 316 includes determining if collision analysis has been performed at all of the sample locations. If collision analysis has not been performed at all of the sample locations, then the sub-method 316 moves back to 602, and the test volume is placed at the next sample location and collision analysis is performed. Collision analysis is performed iteratively until collision analysis is performed at all sample locations. Once collision analysis is performed at all sample locations, the sub-method 316 ends, and the method 300 moves to 320 shown in FIG. 4.

Figure 7:
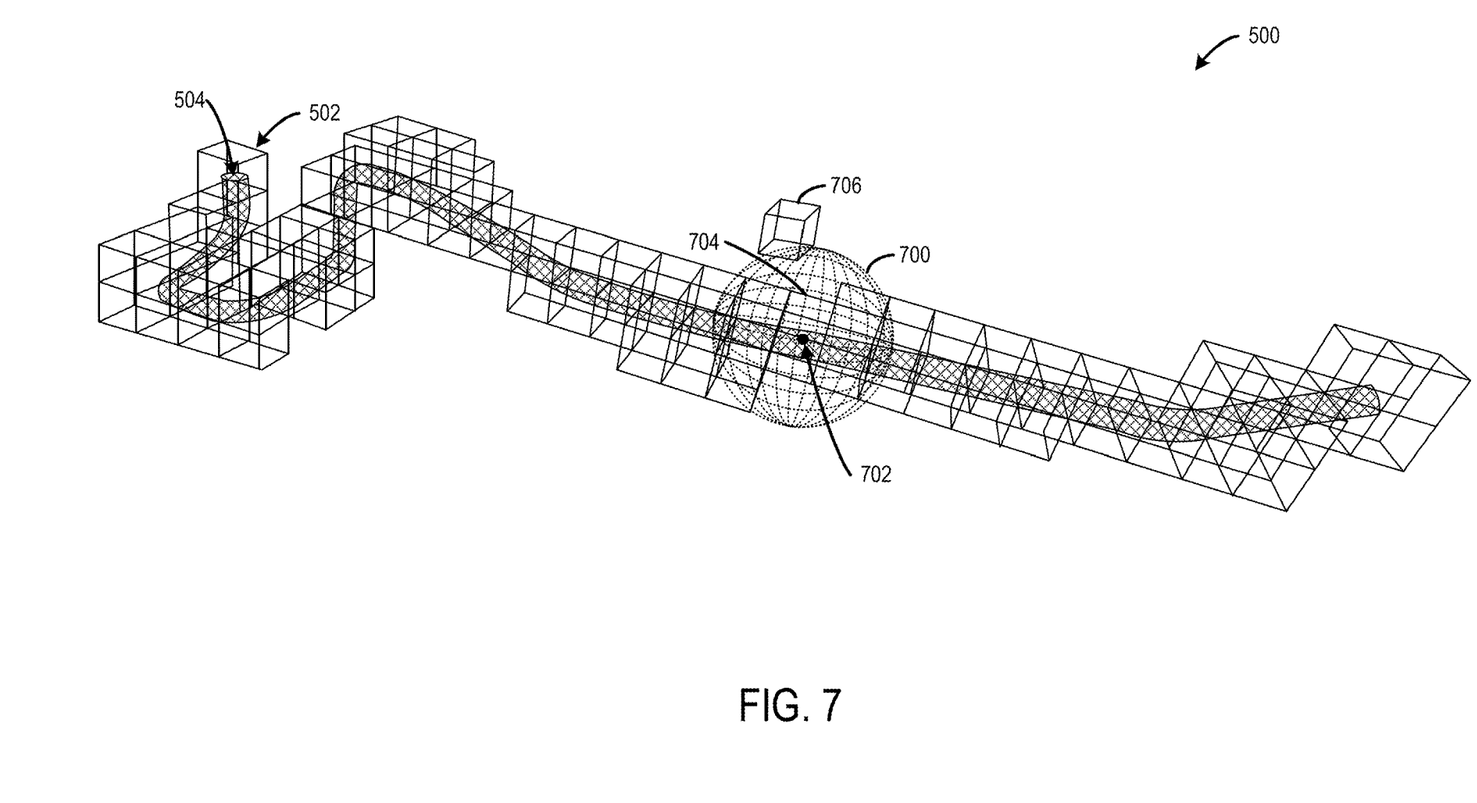
FIG. 7 shows an example scenario where a test volume is positioned at a sample location for collision analysis.

FIG. 7 shows an example scenario where a test volume is positioned at a sample location for collision analysis. In the illustrated example, a test volume in the form of a sphere 700 is used to perform collision analysis on the volume occupancy map 500 of volumetric elements 502 representing the wire 504 and other objects in the 3D virtual environment.

For collision analysis of the wire 504, the sphere 700 is iteratively positioned at a center point of each volumetric element that corresponds to the wire 504 to determine whether any volumetric elements corresponding to other objects collide with the sphere 700. In one example, the sphere 700 is moved to the center point of each volumetric element 502 that corresponds to the wire 504 to perform collision analysis for the wire 504. In the illustrated example, the sphere 700 is aligned with a center point 702 of a volumetric element 704 that corresponds to the sample location. At the sample location, the sphere 700 collides with another volumetric element 706 in the volume occupancy map 500 corresponding to a different object in the 3D virtual environment. As a result of such collision analysis, the wire 504 is identified as violating the separation rules in the example.

In some embodiments, after a voxel collision is detected, an additional more granular collision analysis optionally may be performed to detect if the sphere does indeed collide with a surface of the object within the corresponding volumetric element to confirm that there is a violation of the separation rules.

In the illustrated example, the collision analysis is performed on a wire 504 that is a static component in the 3D virtual environment. The herein-described collision analysis also is performed in the same manner for collision objects that move through the 3D virtual environment. In another example where the wire 504 is moving through the 3D virtual environment, collision analysis is performed at each volumetric element 502 corresponding to the wire 504 for each step along a motion path of the wire 504. Instead of generating different volume occupancy maps for each step of the motion path, spatial transformations are applied to the coordinates of the volumetric elements to indicate the different positions of the volumetric element as the wire 504 moves along the motion path. By applying spatial transformations, the volume occupancy map need not be re-generated over and over allowing for computations to be reduced and efficiency of analysis to be increased relative to an approach where volume occupancy maps are re-generated over and over.

Figure 8:
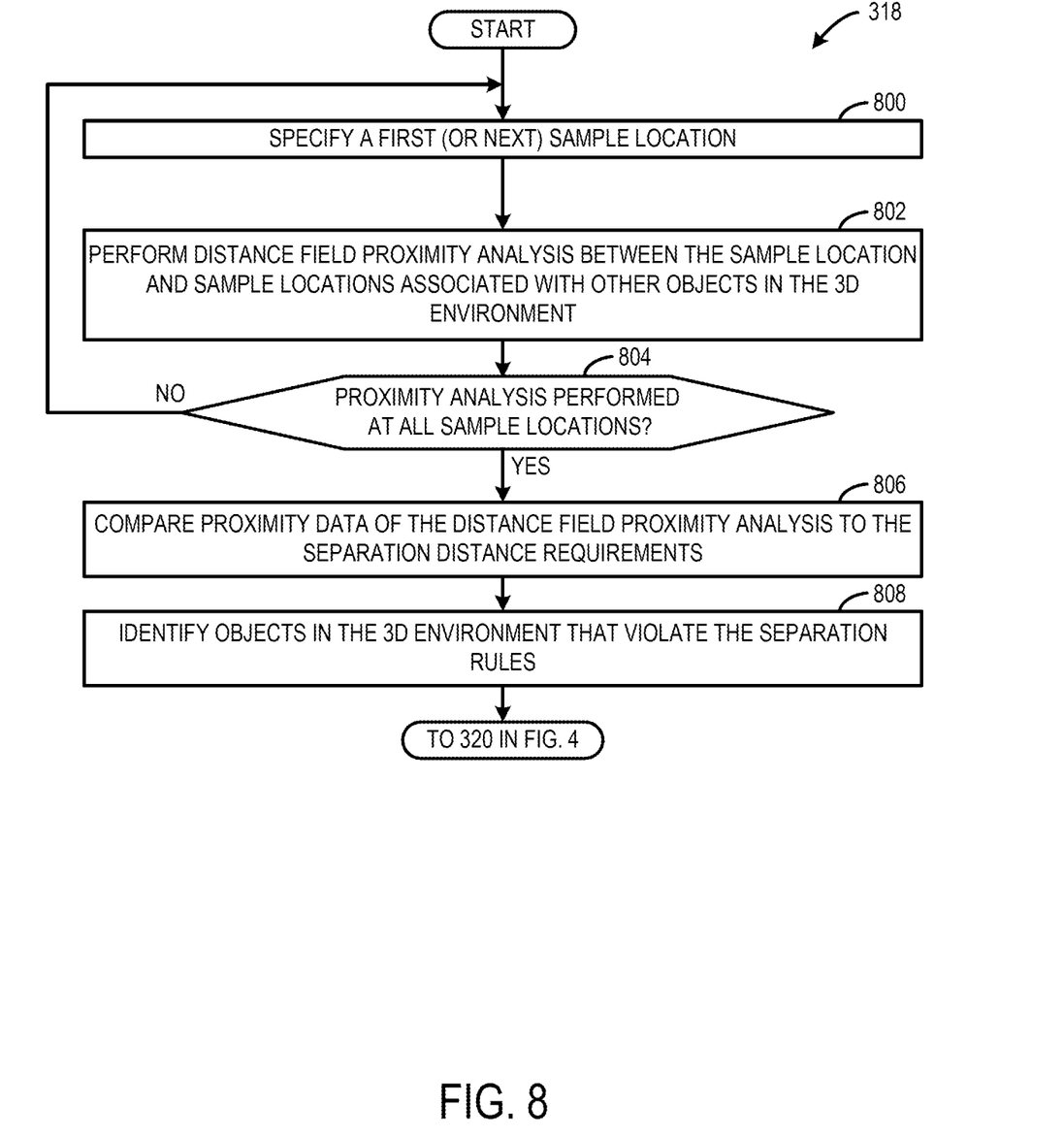
FIG. 8 shows an example proximity analysis method.

Returning to FIG. 3, in some embodiments, at 318, proximity analysis optionally may be performed. FIG. 8 shows an example proximity analysis sub-method 318 that may be performed as part of the computer-automated separation rules compliance method 300. For example, the sub-method 318 may be performed by the computing system 900 shown in FIG. 9, or generally any suitable computer or a plurality of computers.

At 800, the sub-method 318 includes specifying a first sample location. Depending on the scenario, the sample location may correspond to a collision object on a motion path or a static object. In embodiments where a volume occupancy map representing objects in the 3D virtual environment as volumetric elements is generated (e.g., the volume occupancy map 500 of the wire 504 shown in FIG. 5), the sample location corresponds to a volumetric element of an object.

At 802, the sub-method 318 includes performing distance field proximity analysis between the sample location and sample locations associated with other objects in the 3D virtual environment. Distance field proximity analysis includes performing pair-wise proximity analysis between the sample location and every other sample location of other objects. Such pair-wise proximity analysis is performed between the sample location and all sample location of other objects in the 3D virtual environment (or a volume of interest in the 3D virtual environment) to determine distance-to-surface values for each object.

In some examples, distance field proximity analysis is performed on a collision object that follows a motion path. In such examples, the distance field proximity analysis is performed on the collision object for each step along the motion path.

In some embodiments, the distance field proximity analysis is applied to a volume occupancy map of the 3D virtual environment (e.g., the volume occupancy map 500 shown in FIG. 5) to determine separation distances between voxelized representations of the objects (e.g., separation distances between the wire 504 and other objects). In such embodiments, the accuracy of the distance estimates is a function of the size of the voxels defined to represent the objects.

At 804, the sub-method 318 includes determining if distance field proximity analysis has been performed for all sample locations. If proximity analysis has not been performed for all sample locations, then the sub-method 318 returns to 800 and a next sample location is specified for distance field proximity analysis. The sub-method 318 continues until proximity analysis has been performed for all sample locations and the sub-method moves to 806. In one example, such proximity analysis results in n*(n−1)/2 pair-wise proximity tests, where n is the number of objects in the 3D virtual environment. Further, the distance field results from the individual pair-wise proximity tests are merged to create a combined distance field arrays for each of the object of interest being analyzed. The distance field arrays for the different objects are stored as proximity data in memory of the computer.

The distance field proximity analysis incorporates a distance field approach to find the nearest surface of one object relative to surface locations on another object. Such analysis results in an array of nearest neighbor values for points on the surface of an object of interest relative to other selected objects in the 3D virtual environment.

At 806, the sub-method 318 includes comparing proximity data of the distance field proximity analysis to the separation distance requirements established by the separation rules. Said comparing is performed by the computer. In one example, said comparing includes determining a distance between sample locations and locations of other objects in the 3D virtual environment.

At 808, the sub-method 318 includes identifying objects in the 3D virtual environment that violate the separation rules based on said comparison. The names or ID numbers of objects that violate the separation rules along with the 3D locations of the violating objects are stored in memory of the computer. In some examples, additional levels of filtering are used, involving multi-pass analyses based on learning from prior analysis results. In some embodiments, identifying objects in the 3D virtual environment that violate the separation rules optionally may include displaying the objects, via a 3D visualization environment software application, to allow for a manual visual confirmation of such violations.

Once the objects in the 3D virtual environment that violate the separation rules are identified, the sub-method 318 ends, and the method 300 moves to 320 shown in FIG. 4.

Turning to FIG. 4, in some embodiments at 320, the method 300 optionally may include logging results of the proximity and/or collision analysis including a reference (e.g. name or ID number) to the objects identified as violating the separation rules along with 3D locations in the 3D virtual environment of the objects identified as violating the separation rules in an analysis recording database.

In some embodiments, at 322, the method 300 optionally may include determining if refinement of at least some of the objects in the 3D virtual environment is required for compliance with the separation rules. If refinement of at least some of the objects is required, then the method 300 moves to 324. Otherwise, the objects in the 3D virtual environment are in compliance with the separation rules and the method 300 ends.

In some embodiments, at 324, the method 300 optionally may include comparing the results of the proximity and/or collision analysis to previously logged results of previous proximity and/or collision analysis to determine if previously applied classifications applied to the previously logged results are applicable to the results of the proximity and/or collision analysis.

Returning to the example of the aircraft, such classifications may specify that an object that is associated with a particular aircraft system (e.g., electrical, hydraulic, flight control) may have a similar resolution to comply with the separation rules as another similar type of component associated with the same aircraft system. For example, if the electrical wire 504 shown in FIG. 5 violates the separation rules and has a similar classification to another wire in the electrical system that previously violated the separation rules, the wire 504 in violation of the separation rules is classified in the same manner. Further, a similar approach to resolving the rules violations may be applied to the wire 504 as was previously applied to the other wire in order to bring the wire 504 in compliance with the separation rules.

In some embodiments, current analysis results may be reviewed to determine if any of a set of standard resolutions can be recommended for resolving the separation rules violations. Such standard resolutions include, but are not limited to, waiving a separation rule, and applying for a deviation request/waiver, adding an additional support structure (e.g., clamps, brackets), moving a specific component in a specified direction in order to meet the separation requirement, adding shielding (e.g., braided wrapping around wires, physical barrier between objects), etc.

In some embodiments, at 326, the method 300 optionally may include applying applicable classifications to the results of the proximity and/or collision analysis based on said comparing. The analysis results, classification and recommended resolutions are recorded in the analysis database to enable communication and resolution of the issue identified.

In some embodiments, applying applicable classifications and/or resolutions to the results of the analysis include notifying responsible agents of the potential violations after the analysis results are recorded. For example, the agents include automated processes, a person, or a person monitoring the automated process.

In some embodiments, at 328, the method 300 may optionally include changing one or more object in the 3D environment. Such change include, but are not limited to, changing a location, changing out a part for a different size, adding shielding, or making other changes.

In some embodiments, to address the separation rules violations associated with the identified objects, an automated agent is used to attempt to find an alternate location for the objects violating the requirements. For example, if plausible alternate locations have been pre-defined (such as from flexibility in install notes, a pre-defined location/substitution list, or formula), the system selects one of those locations to test. If a certain option within a specific range is suggested then the change could be automatic, but if no automated solutions are possible, a human agent is notified in order to find alternate locations, substitutions, or redesign of the violating objects. In some situations, the solution includes finding a new location for one or more objects within a range of acceptable solutions. In some examples, finding a solution to compliance of the separation rules involves an iterative process in which one or more objects are moved within a pre-defined acceptable volume.

In some embodiments, an optimization algorithm is used to determine if improvement on the overall constraint satisfaction (i.e., an objective function) is being made at each iteration, and to provide an indication of which direction of motion of an object improves the objective function results. For example, an optimization technique (e.g., a gradient descent method) is used with the distance field proximity approach described earlier in which the minimum distance results from the current iteration are compared to the minimum distance results from prior iteration. The change in distance (gradient) is used to indicate which direction to try for subsequent iterations. For the collision analysis described in sub-method 316, which provides contact state information, but not specific proximity values, other iterative optimization techniques can be used, such as those involving random walk methods or other stochastic techniques.

In some embodiments, one or more changed objects in the changed 3D virtual environment are specified to be changed based on a pre-defined hierarchal order. In some embodiments, weighting factors are used to decide which objects are viable candidates to be changed/moved. For example, it may be easier to move a wire than a hydraulic actuator, so the pre-defined object hierarchy accounts for the relative ease of moving the wire as compared to the hydraulic actuator. Thus, the wire is prioritized over the hydraulic actuator in the hierarchical order. If the separation problem is not solved by moving the wire, then the next component in the hierarchy is moved, and so on.

When a large number of objects are being analyzed for separation rules compliance, there may be multiple groups of components that have independent separation rules violations. In such scenarios, the hierarchy is used to define the order in which these groups of components are evaluated. For example, the group that contains the highest ranked pair of components in the hierarchy is evaluated first (and then within that grouping, the component with the highest ranking in hierarchy is addressed first). Once the grouping with the highest-ranking parts is addressed, then next highest-ranking group is evaluated.

Once a candidate solution is formulated and one or more objects in the 3D virtual environment are changed, the method 300 returns to 304 and the separation rules compliance analysis is performed again on the changed 3D virtual environment. The method 300 is performed repeatedly with various refinements of objects in the 3D virtual environment in order to remedy the violations of the separation rules.

By performing one or more of proximity and collision analysis on intelligently sampled locations that are associated with objects in the 3D virtual environment, such analysis need not be performed at locations in the 3D virtual environment that are not of interest. Such selective analysis provides the ability to find critical vulnerable objects associated with separation distances in an automated fashion that is more efficient than a "brute force" approach.

In some embodiments, the methods and processes described herein may be tied to a computing system of one or more computing devices. In particular, such methods and processes may be implemented as an executable computer-application program, a network-accessible computing service, an application-programming interface (API), a library, or a combination of the above and/or other computer resources.

Figure 9:
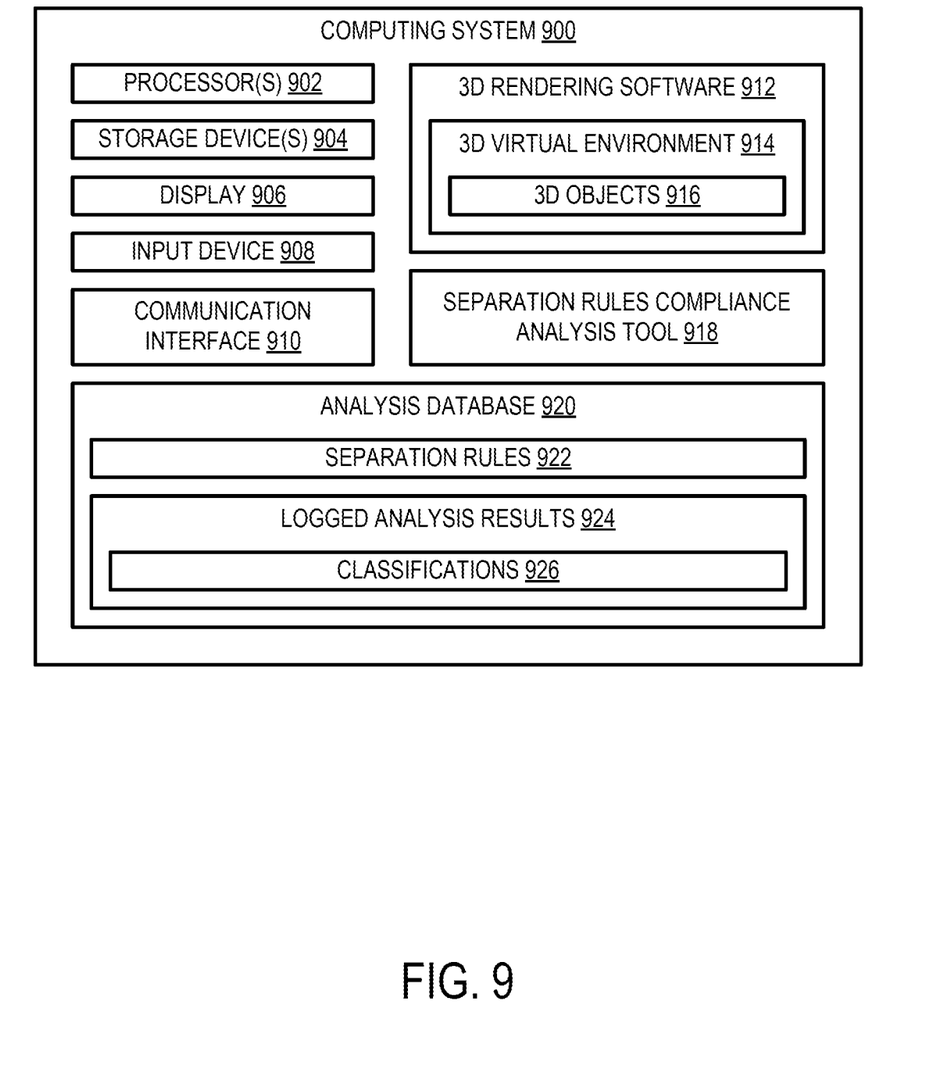
FIG. 9 shows an example computing system.

FIG. 9 shows an example computing system 900 that is configured to perform efficient separation rules compliance analysis as described-herein. The computing system 900 comprises one or more processors 902, one or more storage devices 904. The computing system 900 includes one or more physical devices. In some examples, the computing system 900 includes a plurality of networked computing devices (e.g., a cluster or cloud computing system). Additionally, the computing system 900 optionally may comprise a display 906, an input device 908, and a communication interface 910.

The one or more processors 902 are configured to execute instructions stored in the one or more storage devices 904. For example, the one or more processors 902 can execute instructions that are part of one or more tools, applications, services, programs, routines, libraries, objects, components, data structures, or other logical constructs. The one or more processors 902 can be configured to execute software instructions. Additionally, or alternatively, the one or more processors 902 can be configured to execute hardware or firmware instructions. The processors 902 can be single-core or multi-core, and the instructions executed thereon can be configured for sequential, parallel, and/or distributed processing.

The one or more processors 902 are communicatively coupled with the one or more storage devices 904. The one or more storage devices 904 may include physical devices that are removable and/or built-in. The one or more storage devices 904 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. The one or more storage devices 304 may include nonvolatile, dynamic, static, read/write, read-only, sequential-access, location-addressable, file-addressable, and/or content-addressable devices. The one or more storage devices 904 may further include physical devices that include random-access memory. The random-access memory may be utilized by the one or more processors 902 to temporarily store information during processing of software instructions.

Aspects of the one or more processors 902 and the one or more storage devices 904 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, the display 906 can include one or more display devices utilizing virtually any type of technology. Such display devices can be combined with the computing system 900 in a shared enclosure, or such display devices can be peripheral display devices. The display 906 may be configured to visually present one or more views of a 3D virtual environment 914 for visual inspection of results of separation rules compliance analysis performed on 3D objects 916 in the 3D virtual environment 914.

When included, the input device 908 includes or interfaces with one or more devices configured to translate human actions into computer-understandable information.

Nonlimiting examples of input devices include a keyboard, mouse, track pad, button, dial, touchscreen, and/or computer interface (e.g., serial or universal serial bus) for interfacing with peripheral input devices. In some embodiments, the input device 908 can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or camera for machine vision and/or gesture recognition.

The communication interface 910 is configured to communicate data between the computing system 900 and a remote computing system via a computer network such that the computing system 900 and the remote computing system are communicatively coupled. The communication interface 910 includes wired and/or wireless communication devices compatible with one or more different communication protocols. As non-limiting examples, the communication interface 910 can be configured for communication via a wireless telephone network, or a wired or wireless local- or wide-area network.

The computing system 900 is configured such that the one or more storage devices 904 hold instructions executable by the one or more processors 902 to execute 3D rendering software 912 that is configured to render a 3D virtual environment 914 including modeled 3D objects 916. The computing system 900 is configured such that the one or more storage devices 904 hold instructions executable by the one or more processors 902 to execute a separation rules compliance analysis tool 918. In some examples, the separation rules compliance analysis tool 918 is executed as part of the 3D rendering software 912. In other examples, the 3D rendering software 912 and the separation rules compliance analysis tool 918 are executed separately. For example, the separation rules compliance analysis tool 918 performs computations in a batch mode without the 3D rendering software 912 re-rendering the 3D virtual environment.

In one example, the separation rules compliance analysis tool 918 is configured to perform the computer-automated separation rules compliance method 300 shown in FIGS. 3 and 4. The separation rules compliance analysis tool 918 is configured to define separation rules 922 and store the separation rules in an analysis database 920. The separation rules compliance analysis tool 918 is configured to perform proximity and/or collision analysis on sample locations corresponding to at least some 3D objects 916 in the 3D virtual environment 914 to determine separation distances between the 3D objects 916. The separation rules compliance analysis tool 918 is configured to compare the determined separation distances to the separation distance requirements and identify 3D objects 916 in the 3D virtual environment 914 that violate the separation rules.

Upon performing such analysis, the separation rules compliance analysis tool 918 is configured to log analysis results 924 in the analysis database 920. The logged results 924 may be compared to previously logged results of previous proximity and/or collision analysis to determine if previously applied classifications 926 applied to the previously logged results are applicable to the results of the current proximity and/or collision analysis. The separation rules compliance analysis tool 918 is configured to apply any applicable classifications to the current results of the proximity and/or collision analysis to help remedy separation rule violations.

In an example, a computer-automated separation rules compliance method, the method comprises defining separation rules that establish separation distance requirements between objects in a three-dimensional (3D) virtual environment, specifying sample locations associated with at least some of the objects in the 3D virtual environment, performing one or more of proximity and collision analysis on the sample locations to determine separation distances between the objects, comparing the determined separation distances to the separation distance requirements, and identifying objects in the 3D virtual environment that violate the separation rules based on said comparing. In the example and/or other examples, the computer-automated separation rules compliance method optionally may further comprise generating a volume occupancy map of the 3D virtual environment, the volume occupancy map representing objects in the 3D virtual environment as volumetric elements, and wherein the sample locations on which said one or more of proximity and collision analysis is performed correspond to at least some of the volumetric elements. In the example and/or other examples, the computer-automated separation rules compliance method optionally may further comprise identifying 3D locations in the 3D virtual environment of the objects identified as violating the separation rules. In the example and/or other examples, the computer-automated separation rules compliance method optionally may further comprise specifying a motion path of a collision object in the 3D virtual environment, and the sample locations correspond to points on the collision object when the collision object may be positioned at different steps along the motion path. In the example and/or other examples, at least some of the sample locations may correspond to different points on an object in the 3D environment, and performing said one or more of proximity and collision analysis may comprise, detecting if a test volume positioned at a sample location on the object collides with any other objects in the 3D virtual environment. In the example and/or other examples, the test volume may be a sphere having a radius that is specified based on the separation rules. In the example and/or other examples, performing said one or more of proximity and collision analysis may comprise 1) at each sample location, performing distance field proximity analysis between the sample location and sample locations associated with other objects in the 3D virtual environment, 2) comparing proximity data of the distance field proximity analysis to the separation distance requirements, and 3) identifying objects in the 3D virtual environment that violate the separation rules. In the example and/or other examples, the computer-automated separation rules compliance method optionally may further comprise logging results of the one or more of proximity and collision analysis including one or more of the objects identified as violating the separation rules and the 3D locations in the 3D virtual environment of the objects identified as violating the separation rules in an analysis recording database, comparing the results of the one or more of proximity and collision analysis to previously logged results of previous proximity and/or collision analysis to determine if previously applied classifications applied to the previously logged results are applicable to the results of the one or more of proximity and collision analysis, and applying applicable classifications to the results of the proximity and/or collision analysis based on said comparing. In the example and/or other examples, the computer-automated separation distance compliance method optionally may further comprise changing one or more objects in the 3D virtual environment to generate a changed 3D virtual environment, specifying sample locations associated with objects in the changed 3D virtual environment, performing one or more of proximity and collision analysis on the sample locations to determine separation distances between the objects, comparing the determined separation distances to the separation distance requirements, and determining that the objects previously identified as violating the separation rules are now in compliance with the separation rules. In the example and/or other examples, the one or more changed objects in the changed 3D virtual environment may be specified to be changed based on a pre-defined hierarchal order.

In another example, a computing system comprises a logic subsystem, a storage subsystem comprising instructions executable by the logic subsystem to define separation rules that establish separation distance requirements between objects in a 3D virtual environment, specify sample locations associated with at least some of the objects in the 3D virtual environment, perform one or more of proximity and collision analysis on the sample locations to determine separation distances between the objects, compare the determined separation distances to the separation distance requirements, and identify objects in the 3D virtual environment that violate the separation rules based on said comparing. In the example and/or other examples, the instructions may be further executable by the logic subsystem to generate a volume occupancy map of the 3D virtual environment, the volume occupancy map representing objects in the 3D virtual environment as volumetric elements, and wherein the sample locations on which said one or more of proximity and collision analysis is performed correspond to at least some of the volumetric elements. In the example and/or other examples, the instructions may be further executable by the logic subsystem to identify 3D locations in the 3D virtual environment of the objects identified as violating the separation rules. In the example and/or other examples, the instructions may be further executable by the logic subsystem to specify a motion path of a collision object in the 3D virtual environment, and the sample locations may correspond to points on the collision object when the collision object is positioned at different steps along the motion path. In the example and/or other examples, at least some of the sample locations may correspond to different points on an object in the 3D virtual environment, and performing said one or more of proximity and collision analysis may comprise, detecting if a test volume positioned at a sample location on the object collides with any other objects in the 3D virtual environment. In the example and/or other examples, the test volume may be a sphere having a radius that is specified based on the separation rules. In the example and/or other examples, performing said one or more of proximity and collision analysis may comprise 1) at each sample location, performing distance field proximity analysis between the sample location and sample locations associated with other objects in the 3D virtual environment, 2) comparing proximity data of the distance field proximity analysis to the separation distance requirements, and 3) identifying objects in the 3D virtual environment that violate the separation rules and 3D locations in the 3D virtual environment of the objects identified as violating the separation rules. In the example and/or other examples, the instructions may be further executable by the logic subsystem to log results of the one or more of proximity and collision analysis including one or more of the objects identified as violating the separation rules and 3D locations in the 3D virtual environment of the object identified as violating the separation rules in an analysis recording database, compare the results of the one or more of proximity and collision analysis to previously logged results of previous one or more of proximity and collision analysis to determine if previously applied classifications applied to the previously logged results are applicable to the results of the one or more of proximity and collision analysis, and apply applicable classifications to the results of the one or more of proximity and collision analysis based on said comparing. In the example and/or other examples, the instructions may be further executable by the logic subsystem to change one or more objects in the 3D virtual environment to generate a changed 3D virtual environment, specify sample locations associated with objects in the changed 3D virtual environment, perform one or more of proximity and collision analysis on the sample locations to determine separation distances between the objects, compare the determined separation distances to the separation distance requirements, and determine that the objects previously identified as violating the separation rules are now in compliance with the separation rules.

In yet another example, a computer-readable storage device comprises instructions executable by a processor to define separation rules that establish separation distance requirements between objects in a 3D virtual environment, specify sample locations associated with at least some of the objects in the 3D virtual environment, perform one or more of proximity and collision analysis on the sample locations to determine separation distances between the objects, compare the determined separation distances to the separation distance requirements, and identify objects in the 3D virtual environment that violate the separation rules based on said comparing.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A computer-automated separation rules compliance method, the method comprising:
    defining separation rules that establish separation distance requirements between objects in a three-dimensional (3D) virtual environment;
    specifying sample locations associated with at least some of the objects in the 3D virtual environment;
    performing one or more of proximity and collision analysis on the sample locations to determine separation distances between the objects;
    comparing the determined separation distances to the separation distance requirements;
    identifying objects in the 3D virtual environment that violate the separation rules based on said comparing;
    changing one or more objects in the 3D virtual environment to generate a changed 3D virtual environment, wherein the one or more changed objects in the changed 3D virtual environment are specified to be changed based on a pre-defined hierarchal order;
    specifying sample locations associated with objects in the changed 3D virtual environment;
    performing one or more of proximity and collision analysis on the sample locations associated with the objects in the changed 3D virtual environment to determine separation distances between the objects in the changed 3D virtual environment;
    comparing the determined separation distances to the separation distance requirements; and determining that the objects previously identified as violating the separation rules are now in compliance with the separation rules.

2. The computer-automated separation rules compliance method of claim 1, further comprising:
generating a volume occupancy map of the 3D virtual environment, the volume occupancy map representing objects in the 3D virtual environment as volumetric elements, and wherein the sample locations on which said one or more of proximity and collision analysis is performed correspond to at least some of the volumetric elements.

3. The computer-automated separation rules compliance method of claim 1, further comprising:
identifying 3D locations in the 3D virtual environment of the objects identified as violating the separation rules.

4. The computer-automated separation rules compliance method of claim 1, further comprising:
specifying a motion path of a collision object in the 3D virtual environment; and
wherein the sample locations correspond to points on the collision object when the collision object is positioned at different steps along the motion path.

5. The computer-automated separation rules compliance method of claim 1, wherein at least some of the sample locations correspond to different points on an object in the 3D virtual environment, and wherein performing said one or more of proximity and collision analysis comprises detecting if a test volume positioned at a sample location on the object collides with any other objects in the 3D virtual environment.

6. The computer-automated separation rules compliance method of claim 5, wherein the test volume is a sphere having a radius that is specified based on the separation rules.

7. The computer-automated separation rules compliance method of claim 1, wherein performing said one or more of proximity and collision analysis comprises 1) at each sample location, performing distance field proximity analysis between the sample location and sample locations associated with other objects in the 3D virtual environment, 2) comparing proximity data of the distance field proximity analysis to the separation distance requirements, and 3) identifying objects in the 3D virtual environment that violate the separation rules.

8. The computer-automated separation rules compliance method of claim 1, further comprising:
logging results of the one or more of proximity and collision analysis including one or more of the objects identified as violating the separation rules and the 3D locations in the 3D virtual environment of the objects identified as violating the separation rules in an analysis recording database;
comparing the results of the one or more of proximity and collision analysis to previously logged results of previous one or more of proximity and collision analysis to determine if previously applied classifications applied to the previously logged results are applicable to the results of the proximity and/or collision analysis; and
applying applicable classifications to the results of the proximity and/or collision analysis based on said comparing.

9. The computer-automated separation rules compliance method of claim 1, wherein the pre-defined hierarchal order ranks objects according to a relative ease of moving the objects.

10. A computing system comprising:
a logic subsystem;
a storage subsystem comprising instructions executable by the logic subsystem to:
define separation rules that establish separation distance requirements between objects in a 3D virtual environment;
specify sample locations associated with at least some of the objects in the 3D virtual environment;
perform one or more of proximity and collision analysis on the sample locations to determine separation distances between the objects;
compare the determined separation distances to the separation distance requirements;
identify objects in the 3D virtual environment that violate the separation rules based on said comparing;
log results of the one or more of proximity and collision analysis including one or more of the objects identified as violating the separation rules and 3D locations in the 3D virtual environment of the object identified as violating the separation rules in an analysis recording database;
compare the results of the one or more of proximity and collision analysis to previously logged results of previous one or more of proximity and collision analysis to determine if previously applied classifications applied to the previously logged results are applicable to the results of the one or more of proximity and collision analysis; and
apply applicable classifications to the results of the one or more of proximity and collision analysis based on said comparing.

11. The computing system of claim 10, wherein the instructions are further executable by the logic subsystem to:
generate a volume occupancy map of the 3D virtual environment, the volume occupancy map representing objects in the 3D virtual environment as volumetric elements, and wherein the sample locations on which said one or more of proximity and collision analysis is performed correspond to at least some of the volumetric elements.

12. The computing system of claim 11, wherein the instructions are further executable by the logic subsystem to:
identify 3D locations in the 3D virtual environment of the objects identified as violating the separation rules.

13. The computing system of claim 10, wherein the instructions are further executable by the logic subsystem to:
specify a motion path of a collision object in the 3D virtual environment; and
wherein the sample locations correspond to points on the collision object when the collision object is positioned at different steps along the motion path.

14. The computing system of claim 10, wherein at least some of the sample locations correspond to different points on an object in the 3D virtual environment, and wherein performing said one or more of proximity and collision analysis comprises, detecting if a test volume positioned at a sample location on the object collides with any other objects in the 3D virtual environment.

15. The computing system of claim 14, wherein the test volume is a sphere having a radius that is specified based on the separation rules.

16. The computing system of claim 10, wherein performing said one or more of proximity and collision analysis comprises 1) at each sample location, performing distance field proximity analysis between the sample location and sample locations associated with other objects in the 3D virtual environment, 2) comparing proximity data of the distance field proximity analysis to the separation distance requirements, and 3) identifying objects in the 3D virtual environment that violate the separation rules and 3D locations in the 3D virtual environment of the objects identified as violating the separation rules.

17. The computing system of claim 10, wherein the instructions are further executable by the logic subsystem to:
    change one or more objects in the 3D virtual environment to generate a changed 3D virtual environment;
    specify sample locations associated with objects in the changed 3D virtual environment;
    perform one or more of proximity and collision analysis on the sample locations to determine separation distances between the objects;
    compare the determined separation distances to the separation distance requirements; and
    determine that the objects previously identified as violating the separation rules are now in compliance with the separation rules.

18. The computing system of claim 17, wherein the one or more changed objects in the changed 3D virtual environment are specified to be changed based on a pre-defined hierarchal order.

19. A computer-readable storage device comprising instructions executable by one or more processors to:
    define separation rules that establish separation distance requirements between objects in a 3D virtual environment;
    specify sample locations associated with at least some of the objects in the 3D virtual environment;
    perform one or more of proximity and collision analysis on the sample locations to determine separation distances between the objects;
    compare the determined separation distances to the separation distance requirements;
    identify objects in the 3D virtual environment that violate the separation rules based on said comparing;
    change one or more objects in the 3D virtual environment to generate a changed 3D virtual environment, wherein the one or more changed objects in the changed 3D virtual environment are specified to be changed based on a pre-defined hierarchal order;
    specify sample locations associated with objects in the changed 3D virtual environment;
    perform one or more of proximity and collision analysis on the sample locations associated with the objects in the changed 3D virtual environment to determine separation distances between the objects in the changed 3D virtual environment;
    compare the determined separation distances to the separation distance requirements; and
    determine that the objects previously identified as violating the separation rules are now in compliance with the separation rules.

20. The computer-readable storage device of claim 19, wherein the pre-defined hierarchal order ranks objects according to a relative ease of moving the objects.

* * * * *